Oct. 20, 1970 D. H. WILLIS 3,535,437

COLOR TELEVISION RECEIVER

Filed May 22, 1968

INVENTOR
DONALD H. WILLIS

BY Eugene M. Whitacre

ATTORNEY

United States Patent Office 3,535,437
Patented Oct. 20, 1970

3,535,437
COLOR TELEVISION RECEIVER

Donald H. Willis, Indianapolis, Ind., assignor to RCA Corporation, a corporation of Delaware Filed May 22, 1968, Ser. No. 730,992
Int. Cl. H04n 9/12
U.S. Cl. 178—5.4 11 Claims

ABSTRACT OF THE DISCLOSURE

There is disclosed a circuit for injecting pulses in a chrominance demodulator matrix amplifier chain in a color television receiver at a predetermined time interval, occurring during each television line, for affecting the background tint of the color display.

Figure 1:
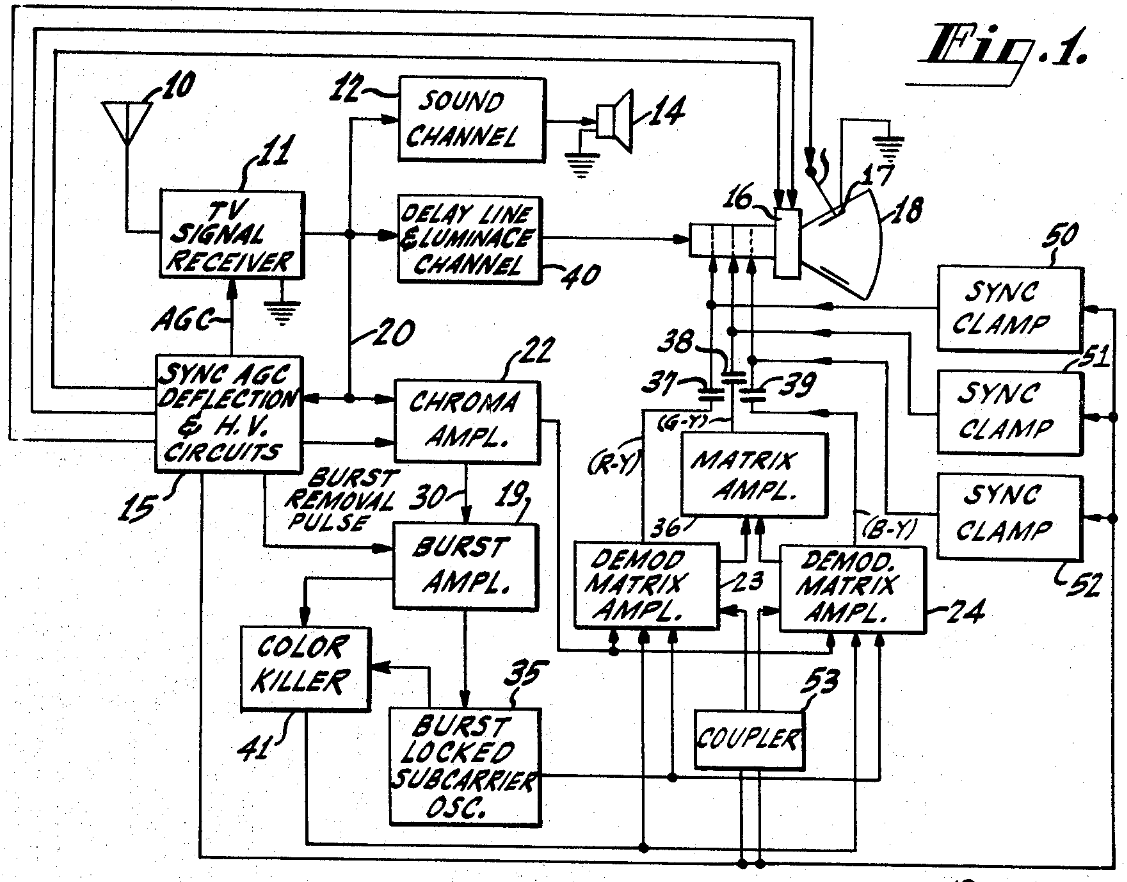

The injected pulses serve to assure that the output of the demodulator matrix amplifier assumes a quiescent level according to the amplitude and polarity of the injected pulse for providing a controllable bias level for the kinescope tube used to present the color display.

In one embodiment the injected pulses used to cancel the effect of a spurious pulse which would otherwise change the bias levels of the kinescope, while a further embodiment injects a controllable pulse to change the bias level according to the preferences of the viewer in obtaining a desired background tint.

This invention relates to television receivers and more particularly to a circuit for shifting the D.C. level at a color input or electrode of a kinescope in a manner to effect the quality of the color display.

In a conventional color television transmission no color scene information is transmitted during the horizontal retrace interval. Reference phase information, commonly referred to as color bursts, of the color subcarrier frequency is transmitted during this interval. The purpose of transmitting color bursts is to permit phase synchronization of the color television receiver to the 3.58 MHz. subcarrier utilized at the transmitter and necessary to obtain proper scene reproduction during a color transmission. The color burst information is usually removed or blanked from the chroma channel of the receiver to avoid coupling of the same to the color demodulators. This technique is commonly referred to as burst elimination. Thus, during the horizontal retrace interval, the color demodulators tend to assume their quiescent or normal operating point.

Relatively early in the history of the development of color television circuitry it was noted that the above situation provided the opportunity to A.C. couple the output of the demodulators to a matrix-amplifier system. In a similar manner the matrix amplifiers were also A.C. coupled to a suitable kinescope electrode.

In order to preserve the D.C. information necessary for good quality color reproduction, a D.C. restoring technique has been employed between the output of the matrix amplifier and the input or suitable electrode of the color kinescope. This D.C. restoring is accomplished by various means commonly referred to as synchronous clamps.

The clamping action which occurs during the horizontal retrace interval serves to return the voltage coupled to the kinescope electrodes to a predetermined D.C. level from which the voltage may have drifted during the scan intervals. The magnitude of the A.C. coupling time constants between the demodulators and the matrix amplifiers input and the coupling time constant between the output of the matrix amplifiers and the kinescope, are determined by the rate of clamping action (i.e. horizontal line frequency).

This D.C. restored input to the color electrodes of the kinescope is used to provide proper background and fidelity of the overall picture both on color transmission and black and white as well.

A common problem in color demodulator design, particularly in a color television receiver employing synchronous clamps, is that during burst removal from the chroma information channel, a pulse can be generated at the output of the demodulator causing a change in the voltage at which clamping occurs. This in turn, affects the background tint of the displayed television scene. This is particularly so when such pulses are of unequal amplitudes at the output of the different demodulators necessary to finally produce the three basic colors, Red, Green and Blue (R, G, and B) by matrixing techniques.

For example, burst elimination in a color television receiver may be accomplished by biasing off an amplifying stage in the chrominance channel, which is otherwise normally biased at some suitable operating point. This results in a relatively substantial change in the output impedance of the amplifier and hence the impedance of the chrominance channel. Depending upon the type of demodulator utilized and the quality of the reference drive of the oscillator this change in impedance may result in a pulse at the output of the demodulator during the burst elimination or retrace time. This pulse then causes, a shift in the bias of the kinescope's input electrode during the scan because it affects the clamping level during retrace and hence will effect the tint or overall background quality of the color scene.

To further complicate matters such demodulators or other considerations may require color killing to be performed after the demodulator circuits. Hence during a monochrome transmission, no spurious pulse could be coupled through the kinescope grid clamping circuits, because of the killer action. This could further cause a different background tint for the monochrome picture as compared to that for the color picture.

It is an object of this invention to provide an improved circuit for a color television receiver serving to eliminate unwanted pulses from affecting the synchronous clamping potential.

It is a further object of this invention to provide improved circuitry which provides a consistent control of the background tint quality of the display.

Still a further object is to provide an improved circuit for shifting the bias of a color electrode of a kinescope in a manner to controllably effect the tint quality of the color display.

In accordance with one form of the invention a circuit develops a pulse of a selected and predetermined magnitude derived from a suitable polarity pulse generated in the receiver during the horizontal retrace interval. This pulse is coupled to a control electrode of a matrix amplifier, and being of said specified polarity and amplitude serves to cancel the effect of a spurious pulse otherwise present at the output of the matrix amplifier, due to perturbations during burst elimination.

In a similar manner, by judicious choice of the injected pulse amplitude and polarity, the output of the matrix amplifiers under the influence of the injected pulse can be made to shift a required amount during each scan to effect the normal synchronous clamping level in the receiver, to give the displayed color scene a tint according to the preferences and under the control of the viewer.

Figure 2:
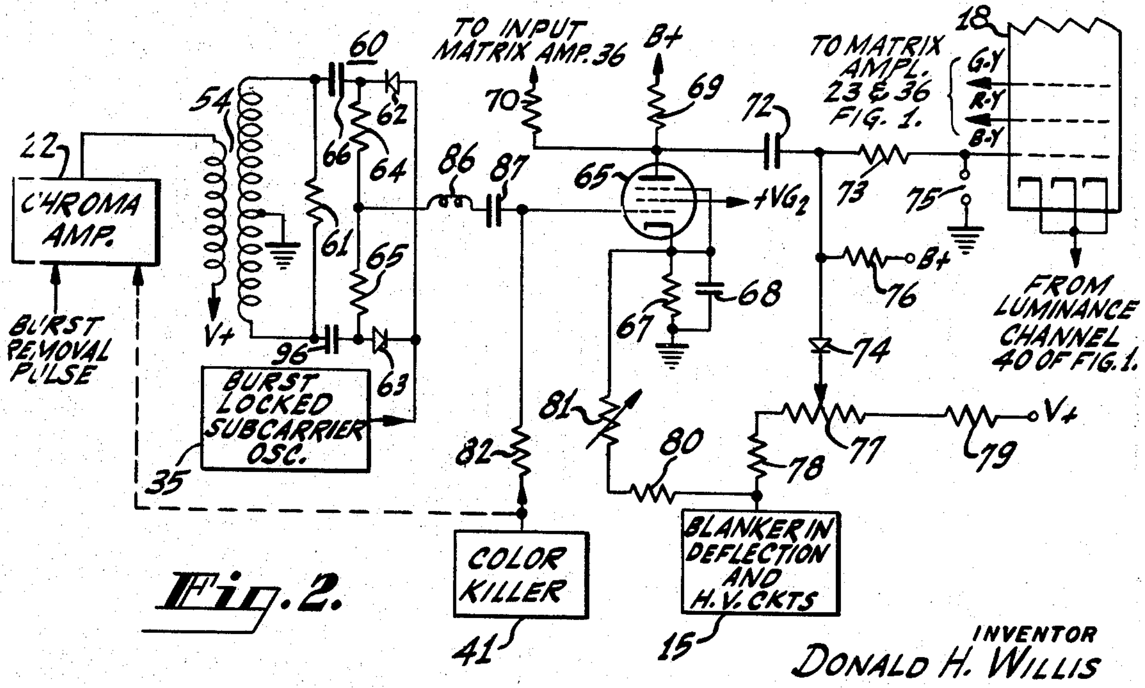

Other objects and advantages of the invention will be apparent and suggest themselves to those skilled in the art to which the invention is related from a reading of the following specification in connection with the accompanying drawings, in which:

FIG. 1 is a schematic diagram in block form of a color television receiver embodying the present invention; and FIG. 2 is a schematic circuit diagram partially in block form of a circuit embodying the principles of this invention.

Referring now to FIG. 1 an antenna 10 is coupled to the input terminals of a television signal received 11. The portion of the receiver included in rectangle 11 includes the tuner, intermediate frequency amplifier, video detector and intercarrier sound detector.

The sound detector provides a 4.5 mHz. intercarrier sound wave which is amplified and detected in the sound channel 12. The recovered audio frequency sound signal is amplified and applied to the loudspeaker 14.

The demodulated video signal from the video detector is applied to the synchronizing, AGC, reflection and high voltage circuits 15. The synchronizing pulse components of the video signal are used to control horizontal and vertical deflection generators. Vertical and horizontal deflection signals developed by the deflection generators included in rectangle 15 are applied to the deflection yoke 16; and a high voltage developed from the horizontal retrace pulse is applied to the ultor 17 of the color kinescope 18, which may be a three electron gun shadow mask tube. The deflection and high voltage circuits 15 also produce pulses at the horizontal rate, and of a suitable pulse and polarity to gate a burst amplifier 19, and to block the passage of the color bursts to the demodulating matrix amplifiers 23 and 24. The gating pulses for the burst amplifier 19 may be provided by an auxiliary winding on the horizontal deflection output transformer associated with the deflection and high voltage circuits 15.

The composite video signal is applied by way of a conductor 20 to a chroma amplifier 22 which is coupled to an input of the demodulating matrix amplifiers 23 and 24. The chrominance sidebands occupy a range of frequencies from 2 to 4.2 mHz. An early amplifying stage of the chrominance amplifier 22 also applies to the chrominance signal to the burst amplifier 19. Burst amplifier 19, keyed by a gate pulse from the deflection and high voltage circuit 15, separates the color synchronizing bursts from the remainder of a received color television signal. The separated bursts are applied to a burst locked subcarrier oscillator 35 to control the frequency and phase of the resultant oscillator signal.

The burst locked oscillator 35 provides a phase locked 3.58 mHz. signal which is applied to the demodulating matrix amplifiers 23 and 24. The oscillator 35 signal is suitably phase shifted to enable demodulation of at least two color difference signals contained in the chrominance signal. These are, for example, shown as the $R-Y$ and $B-Y$. A$G-Y$ signal is obtained by a suitable matrix amplifier 36 having its inputs derived from a portion of the output of the matrix amplifiers 23 and 24. $R-Y$, $B-Y$ and $G-Y$ color difference signals obtained from the demodulation matrix amplifying circuitry are applied to the corresponding control electrodes of the color kinescope 18 by means of the coupling capacitors 37, 38 and 39.

The demodulated video signal is also applied by way of the delay line and luminance channel 40 to the cathodes of the color kinescope 18. A color killer circuit 41 has an output coupled to an input of the demodulating matrix amplifiers 23 and 24. Input to the color killer circuit 41 is obtained from an output of the burst amplifier 19. The color killer circuit 41 serves to monitor the presence or amplitude of the burst signals and will operate to disable the matrix amplifiers 23 and 24 during a monochrome transmission or for the absence of color bursts. A further output from the deflection and high voltage circuits 15 is shown coupled to an input of the chroma amplifier 22 and is designated as the brust removal pulse.

This pulse is derived from a pulse generated in the high voltage circuits 15 during the horizontal retrace time and is in synchronism with the pulse used to gate the burst amplifier 19. The burst removal pulse serves to render a portion of the chroma channel 22 inoperative during the portion of the television line when burst is present. This prevents the coupling of the bursts to the demodulating matrix amplifiers 23 and 24.

D.C. reference or restoration is provided by means of the synchronous clamps 50, 51 and 52 for each of the three control electrodes of the color kinescope 18. The clamping action is determined by a pulse derived from the blanker section of the color television receiver, included in rectangle 15, and coupled to the respective inputs of the synchronous clamps. The amplitude of this blanking pulse, occurring during the horizontal retrace time, operates the clamp circuits causing them to control the charge stored by capacitors 37, 38 and 39, and return to grid electrodes of the kinescope 18 to a specified D.C. reference.

However, during the retrace time the chroma amplifier 22 subjected to the burst removal pulse is gated off. This in turn creates a perturbation in the chroma amplifier channel 22 which can cause a pulse to appear at an output of the matrix amplifiers 23, 24 and 36. Such pulses at these outputs may be of a different amplitude or polarity, due to he particular characteristics of each demodulator matrix amplifier, and will offset the clamping potential in a direction determined by the magnitude and polarity of this spurious pulse. In this manner the clamping reference is no longer determinative of the true quiescent output of the demodulators. This results in a background tint variation of the display. To compensate for and substantially remove the adverse effect produced by such pulses, compensating pulses generated by the circuits in rectangle 15 such as those as used at the input to the synchronous clamps are further coupled to the demodulation matrix amplifiers 23 and 24, via coupler 53.

Coupler 53 serves to determine the amplitude of this pulse to a magnitude sufficient to cancel the spurious pulse which would otherwise be present at the output of amplifiers 23 and 24. This assures that the clamping level at the kinescope electrode is primarily determined by the magnitude of the pulse coupled to the input of the synchronous clamps and is not affected by the spurious pulse which would couple through capacitors 37 to 39.

In FIG. 1, a compensating pulse is injected into the demodulation matrix amplifiers 23 and 24, which are also being killed or biased off during monochrome transmission. Therefore even though the injected pulse is still present during monochrome transmission no net pulse will be developed at the outputs of the matrix amplifiers or effect the D.C. restoration of the grid electrodes of the kinescope 18, because the matrix amplifiers 23 and 24 are killed and therefore nonoperative.

This, of course, is desirable as in the above described embodiment the spurious pulse is cancelled during the color transmission and due to "killing" cannot couple through during a black and white transmission, and so, the background tint is now the same for both. However, if killing was afforded elsewhere in the chroma channel so that the spurious pulse coupled through, both on color and monochrome transmissions and due to the continuous burst elimination pulse, the injected pulse applied, as above, would cancel the same for both monochrome and color transmissions.

Referring to FIG. 2 a schematic circuit of a demodulator matrix amplifier is shown. The chroma amplifier 22, is coupled to an input winding of a bifilar transformer 54 whose secondary winding forms a balanced input to a balanced diode demodulator 60. The center tap of the secondary winding is returned to ground while the output terminals thereof are shunted by a impedance matching resistor 61. The diode demodulator 60 uses diode 62 and 63; the anode of diode 62 being connected to the cathode of diode 63. This junction is coupled to the burst locked oscillator 35 to provide a suitable single ended input for the locked subcarrier frequency necessary to operate the diode demodulator 60.

The cathode of diode 62 is coupled through capacitor 66 to a junction between the secondary winding of transformer 54 and resistor 61. The other junction between the secondary winding of transformer 54 and resistor 61 is coupled to the anode of diode 63 through capacitor 96. A single ended output from demodulator 60 is provided at the junction point of resistors 64 and 65 connected between the cathode of diode 62 and the anode of diode 63.

The diode demodulator 60 referenced to the frequency of the burst locked oscillator 35, demodulates the chroma information coupled thereto to obtain at the output an inverted color difference signal, which may, for example be the $(Y-B)$ signal. The demodulated color difference signal $(Y-B)$ is applied to an input of a color difference matrix amplifier employing pentode 65, via the series circuit of inductor 86 and capacitor 87, connected between the output terminal of demodulator 60 and the grid electrode of pentode 65.

The grid electrode of pentode 65 is coupled through grid leak resistor 82 to the output of the color killer circuit 41. The cathode electrode of pentode 65 is returned to a point of reference potential, such as ground, through a bias resistor 67, which is bypassed for high frequency compensation by capacitor 68. The plate electrode is coupled to B+ through load resistor 69, and resistor 70 supplies a predetermined portion of the inverted plate output or $(B-Y)$ signal, to the input of another matrix amplifier, such as the $(G-Y)$ amplifier 36 of FIG. 1.

The plate electrode of pentode 65 is further coupled to the blue grid electrode or $(B-Y)$ control grid of the kinescope 18 via the series connection of capacitor 72 with current limiting resistor 73. The kinescope grid electrode is protected from excessive voltage by a spark gap 75.

Coupled at the junction between capacitor 72 and resistor 73 is a synchronous diode clamping circuit. The anode of diode 74 is coupled to the junction between capacitor 72 and resistor 73 and is connected to B+ via resistor 76.

The cathode of the diode 74 is returned to the variable arm of a potentiometer 77, forming part of a voltage divider between V+ and the output of the blanker circuit contained in the deflection and high voltage circuit 15. The voltage divider comprising resistors 78 and 79 and potentiometer 77, acts as a load for the blanker stage, which may be a vacuum tube, or other device, while potentiometer 77 further serves to enable initial adjustment of the bias voltage imposed upon the kinescope grid electrode.

A portion of the output of the blanker circuit is applied to the cathode electrode of pentode 65 through resistors 80 and 81, one of which may be variable.

The operation of the circuit is as follows:

During operation, the clamping circuit, including diode 74, serves to reference the A.C. coupled color difference signal at the grid electrode of kinescope 18; to a desired D.C. level determined by the magnitude and D.C. voltage of the pulse generated by the blanker circuit and applied to the cathode of diode 74. This is necessary to permit the signal at the grid of the kinescope to drive the kinescope properly for the input signal with respect to the amplitude and D.C. potential of the luminance signal or Y signal present simultaneously at the cathode electrodes of the kinescope. The D.C. restoration, as indicated, takes place during the horizontal retrace interval. Therefore the clamping potential is determined by the maximum negative swing at the cathode of diode 74 due to the conduction of the blanking circuit gated by the retrace pulse. This in turn assures that the kinescope grid is maintained at a relatively fixed D.C. bias during the horizontal scanning time. However, at the same time clamping occurs, burst elimination is taking place in the chroma amplifier 22. This is afforded by gating off a section thereof with the burst removal pulse, which is synchronous with the retrace interval. This action causes an impedance change in the chroma stages which unbalances the balanced diode demodulator 60 and couples a pulse via inductor 86 and capacitor 87 to the grid electrode of pentode 65. The pentode 65, having a relatively large gain, provides an inverted amplified pulse at the plate output. This pulse couples through to capacitor 72 and will lower or raise the potential, depending on the polarity of the same, at which capacitor 72 is charged, as the transition at the plate of pentode 65 appears on one plate of capacitor 72. This shift in potential resulting in an offset of the clamping level, restores the grid electrode to an undesired level. This causes the $(B-Y)$ control grid or another grid of the kinescope, similarly affected, to be driven out of proportion to the cathode excursions. The result produced is referred to as a color temperature change or a tint variation and will provide an overall color tint to the display presented on the face of kinescope 18. Such a change is, of course, incompatible with the color information actually transmitted.

To correct for this effect a selected portion of the blanking pulse used for clamping or restoring the D.C. at the kinescope electrode is coupled to the cathode electrode of pentode 65, and is selected in amplitude and polarity to cancel the spurious pulse at the grid electrode of pentode 65. Therefore, because the pulse is eliminated the output voltage of the pentode 65 exhibits no transition and the clamping level is correct. In this case, the spurious transition at the grid electrode is a negative pulse and therefore resistors 80 and 81 couple a desired portion of the negative retrace pulse developed during blanking to the cathode of pentode 65.

The amplitude of the same is selected to approximately equal the amplitude of the spurious pulse at the grid by selecting the magnitude of resistors 80 and 81.

It is noted that for a monochrome transmission the same magnitude pulse would be coupled to the cathode of pentode 65 while there is no interferring pulse at the grid. However, as shown, herein, the pentode 65 is killed and therefore non-operative during monochrome transmission. Hence the plate potential of pentode 65 is not affected by the pulse coupled via resistors 80 and 81.

The above technique could be utilized for spurious pulses affecting other kinescope electrodes, as well, independent of the amplitude of the same, providing they occur repetitively at a fixed time, such as during the retrace time.

A circuit built and tested and used in a television receiver to provide the above described operation utilized the following components.

Resistor 61—2200 ohms
Resistor 64—8200 ohms
Resistor 65—8200 ohms
Resistor 67—180 ohms
Resistor 69—22,000 ohms
Resistor 70—150,000 ohms
Resistor 73—1000 ohms
Resistor 76—2.2 megohms
Resistor 77—3000 ohms (variable)
Resistor 78—6800 ohms
Resisotr 79—6800 ohms
Resistor 82—1.0 megohms
Resistors 80–81—330,000 ohms total
Capacitors 66, 96—39 micromicrofarads
Capacitor 68—3300 micromicrofarads
Capacitor 72—.01 microfarad
Capacitor 87—.047 microfarad
Inductor 86—620 microhenries
Pentode 65—½ 6GH8A
Diode 74—FD-222
B+—+405 volts
V+—+330 volts.

The magnitude of the blanker pulse, at the cathode of diode 74 exhibited an excursion during retrace time approximately from +330 to +180 volts or a negative 150 volt peak to peak swing.

With reference again to FIG. 2, there is shown a dashed line from the output of the color killer circuit 41 to an input of the chroma amplifier 22. This is to indicate that color killing could be performed prior to the demodulator 60 and the pentode amplifier 65 of FIG. 2, to accomplish the following objective.

According to the above description a pulse injected during retrace time if not compensated for will cause an improper D.C. restoration at a color control grid electrode of the kinescope. This effect results in a tint change to the display.

Basically color presentation depends partly upon the psychological preferences of the viewer. This fact is well known and referred to and used in the color television, color photography and other similar arts. Therefore, it is statistically certain that different viewers prefer to see a color picture displayed with a different emphasis on the overall tint or color temperature of the scene. In this manner the amplitude of the pulse injected into the appropriate control electrode of matrix amplifier, as 65 of FIG. 2, or any of those shown in FIG. 1 as 23, 24 or 36, is selected by a control coupled to a potentiometer (as 81 of FIG. 2) and under the operation of the viewer. In this way one could select the magnitude of the pulse coupled to the matrix amplifier and purposely affect a desired tint in the final display according to his preferences. Of course, since a black and white display indicates a formulated amount of red, green ad blue, such a control would be operative for monochrome transmission as well; and hence color killing is performed, as shown, by the dotted line, and known in the prior art, prior to the matrix amplifier. In the above manner the selected pulse under control of the viewer will affect the clamping level and the D.C. restoration at any desired kinescope grid and in this way the viewer can select tint suitable to his tastes.

Furthermore, the controllable injected pulse can be made to be effective only during a color transmission and hence be used with a color background control, if killing prevented its appearance during monochrome. However, if killing prevented the injected pulse to appear both during monochrome and color transmissions as well, the control thereof, would result in a universal background tint control. In a similar manner, the color killer circuit could be used to activate the injected pulse source and hence the injected pulses could serve only to effect the monochrome background quality of the display, if this was so desired.

It is anticipated that one may couple to, or inject pulses elsewhere in the chrominance amplifier, demodulator, matrix-amplifier chain and so on, to accomplish the same results as taught above independent of pulse polarity or amplitude.

What is claimed is:

1. Apparatus for use in a television receiver including a color kinescope, said kinescope having a plurality of input electrodes, the color content of the scene displayed by said kinescope being controlled according to color information present in a transmitted video signal during a color transmission, comprising:

(a) a first and second color information processing channel, having first and second outputs respectively, for providing during a color transmission a first signal representative of first color information at said output of said first channel and a second signal representative of second color informattion at said output of said second channel, (b) a first capacitor for A.C. coupling said output of said first channel to a first one of said input electrodes, (c) a second capacitor for A.C. coupling said output of said second channel to a second different one of said input electrodes, (d) first means coupled to said first and second color processing channels for disabling the same during regularly recurring intervals, the operation of said first means in the course of a color transmission tending to cause respective quiescent levels of a first predetermined relationship to appear at said first and second outputs during said intervals, (e) second means coupled to said first and second capacitors for charging each capacitor during said recurring intervals, said charging means establishing the quiescent biases at said first and second electrodes of said kinescope with a relationship therebetween responsive to the relationship of said quiescent levels at said first and second outputs; and (f) third means coupled to said first and second channels for injecting a signal of a selected amplitude and polarity and occurring during said recurring intervals to alter the relationship between the respective quiescent levels at said first and second outputs from said first predetermined relationship in the course of a color transmission.

2. The apparatus according to claim 1 including fourth means coupled to said first and second channels for disabling the same throughout a monochrome transmission in a manner rendering said first and third means ineffective during said monochrome transmission and establishing substantially equal quiescent levels at said first and second outputs throughout said monochrome transmission.

3. Apparatus in accordance with claim 2 wherein the operation of said first means is such as to tend to establish differing quiescent levels at said first and second outputs, and wherein the operation of said third means is such as to alter the relationship between said quiescent levels in a direction reducing the difference between said quiescent levels, whereby the operation of said third means opposes the tendency of the operation of said first means to shift the kinescope electrode bias relationship during color transmission away from the kinescope electrode bias relationship existing during a monochrome transmission.

4. Apparatus according to claim 2 wherein said third means includes means for manually varying the injected signal characteristics whereby the operator of said receiver is provided with a facility for altering, if desired, the kinescope electrode bias relationship during a color transmission relative to the bias relationship existing during a monochrome transmission.

5. The apparatus according to claim 4 wherein said recurring interval is the horizontal retrace interval associated with each television line.

6. The apparatus according to claim 4 wherein the respective signals provided at the outputs of said first and second color processing channels are $B-Y$ and $R-Y$ color difference signals.

7. Apparatus for use in a color television receiver comprising:

(a) a source of composite video signals containing a modulated color subcarrier component and oscillatory bursts of a color subcarrier of a reference phase, (b) first means coupled to said source for extracting said modulated color subcarrier component therefrom, (c) second means coupled to said source responsive to said bursts for extracting said bursts and providing an output signal phase locked to said bursts, (d) third means coupled to said first means to render said first means inoperative when said second means is extracting said burst signal, (e) fourth means responsive to said extracted modulated color subcarrier component and said phase locked output signal for providing a demodulated signal representing color information occurring at a desired phase with respect to said burst phase, said demodulated signal providing means further producing a spurious pulse at said time said first means is rendered inoperative.

(f) a color kinescope having at least one color control electrode, (g) a capacitor for A.C. coupling said fourth means to said color control electrode, (h) D.C. restoring means coupled between a point of reference potential and the junction formed by said capacitor and said kinescope electrode, and operating during said interval when said first means is rendered inoperative to determine the D.C. bias at said color control electrode, the operation of said D.C. restoring means during said interval being such that said D.C. bias will be affected by an appearance of said spurious pulse at said junction, and (i) means coupled to said fourth means for injecting a compensating pulse of suitable amplitude and polarity to substantially preclude appearance of said spurious pulse at said junction.

8. Apparatus for use in a color television receiver comprising:

(a) a source of composite video signals containing a modulated color subcarrier component and oscillatory bursts of a color subcarrier of a reference phase;

(b) first means coupled to said source for extracting said modulated color subcarrier component therefrom;

(c) second means coupled to said source responsive to said bursts for extracting said bursts and providing an output signal phase locked to said bursts;

(d) third means coupled to said first means to render said first means inoperative when said second means is extracting said burst signal;

(e) fourth means responsive to said extracted modulated color subcarrier component and said phase locked output signal for providing different color difference signal outputs at a plurality of output terminals, said color difference signal providing means being undesirably subject to the production of unequal outputs at said plurality of output terminals in response to the operation of said third means;

(f) a color kinescope having a plurality of control electrodes, (g) a plurality of capacitors for A.C. coupling each of said output terminals to a respectively different one of said control electrodes;

(h) clamping means coupled between a point of reference potential and each control electrode-capacitor junction and operating during said interval when said first means is rendered inoperative to determine the D.C. bias at each of said control electrodes, the operation of said clamping means during said interval being such that an imbalance of said D.C. biases will result from the appearance of unequal outputs at said output terminals during said interval; and (i) pulse injecting means coupled to said fourth means for reducing the inequalities among said outputs appearing at said output terminals during said interval whereby to prevent the operation of said third means from introducing a substantial imbalance of said control electrode biases.

9. Apparatus in accordance with claim 8 wherein said receiver also includes means for disabling said fourth means during the reception of monochrome video signals in such a manner that substantially equal outputs appear at said output terminals despite the operation of said third means.

10. In a color television receiver, including a chrominance channel, said chrominance channel, including means responsive to bursts of a color subcarrier present in a received television signal, to develop an oscillatory signal locked to said bursts, said chrominance channel including at least two color demodulator-matrix amplifiers, responsive to said oscillatory signal and chroma information present in said received television signal for developing at least two color signals therefrom for application to the proper electrodes of a kinescope, means including a separate capacitor coupling each of said color demodulator-matrix amplifiers to a separate one of said kinescope electrodes, and means coupled to said coupling means, for restoring D.C. to said color signal prior to the application thereof to said kinescope electrodes during a fixed and predetermined interval associated with each television line, the combination therewith comprising:

(a) means for altering the relationship of said D.C. levels at said kinescope electrodes during a color transmission, as compared to the relationship of said D.C. levels at said kinescope electrodes during a monochrome transmission, (b) wherein said altering means includes means coupled to at least one of said demodulator matrix amplifiers for injecting a pulse thereto of a sufficient magnitude and polarity to affect the level at which said D.C. restoring takes place during said predetermined interval for said color transmission.

11. Apparatus for use in a television receiver including a color kinescope, said kinescope having a plurality of input electrodes, the color content of the scene displayed by said kinescope being controlled according to color information present in a transmitted video signal during a color transmission, comprising:

(a) a first and second color information processing channel, having first and second outputs respectively, for providing during a color transmission a first signal representative of first color information at said output of said first channel and a second signal representative of second color information at said output of said second channel, (b) a first capacitor for A.C. coupling said output of said first channel to a first one of said input electrodes, (c) a second capacitor for A.C. coupling said output of said second channel to a second different one of said input electrodes, (d) first means coupled to said first and second color processing channels for disabling the same during regularly recurring intervals, the operation of said first means in the course of a color transmission tending to cause respective quiescent levels of a first predetermined relationship to appear at said first and second outputs during said intervals, (e) second means coupled to said first and second capacitors for charging each capacitor during said recurring intervals, said charging means establishing the quiescent biases at said first and second electrodes of said kinescope with a relationship therebetween responsive to the relationship of said quiescent levels at said first and second outputs; and (f) third means coupled to said first and second channels for injecting a signal occurring during said recurring intervals to alter the relationship between the respective quiescent levels at said first and second outputs from said first predetermined relationship in the course of a color transmission, (g) fourth means coupled to said third means for varying the magnitude of said injected signal and therefore the relationship between the respective quiescent levels at said first and second outputs.

References Cited

UNITED STATES PATENTS 2,954,426 9/1960 Kroger ............ 178—5.4
3,301,945 1/1967 Dietch ............ 178—5.4

RICHARD MURRAY, Examiner